(12) United States Patent
Nakao (10) Patent No.: US 9,841,801 B2
(45) Date of Patent: Dec. 12, 2017

(54) POWER SUPPLY DEVICE AND IMAGE PROCESSING DEVICE

(71) Applicant: KYOCERA Document Solutions Inc., Osaka (JP)

(72) Inventor: Masahiro Nakao, Osaka (JP)

(73) Assignee: KYOCERA Document Solutions Inc., Tamatsukuri, Chou-ku, Osaka (JP)

( * ) Notice: Subject to any disclaimer, the term of this patent is extended or adjusted under 35 U.S.C. 154(b) by 0 days.

(21) Appl. No.: 15/507,368

(22) PCT Filed: Jan. 20, 2016

(86) PCT No.: PCT/JP2016/051553
§ 371 (c)(1),
(2) Date: Feb. 28, 2017

(87) PCT Pub. No.: WO2016/121595
PCT Pub. Date: Aug. 4, 2016

(65) Prior Publication Data
US 2017/0285714 A1    Oct. 5, 2017

(30) Foreign Application Priority Data

Jan. 28, 2015  (JP) .................................. 2015-014192

(51) Int. Cl.
*B23K 11/24* (2006.01)
*G06F 1/30* (2006.01)
(Continued)

(52) U.S. Cl.
CPC ................ *G06F 1/30* (2013.01); *B41J 29/38* (2013.01); *G03G 21/14* (2013.01); *H04N 1/00* (2013.01)

(58) Field of Classification Search
CPC . G06F 1/30; B41J 29/38; G03G 21/14; H04N 1/00
See application file for complete search history.

(56) References Cited

U.S. PATENT DOCUMENTS

2008/0049062 A1* 2/2008 Igarashi ................... B41J 29/02
347/16

FOREIGN PATENT DOCUMENTS

JP          2009-064146 A      3/2009

* cited by examiner

*Primary Examiner* — Daniel Cavallari
(74) *Attorney, Agent, or Firm* — IP Business Solutions, LLC (57) ABSTRACT

A hardware circuit (403) outputs different output signals between a case where an operation of an operating switch (402) is continued for longer than a threshold time and the other cases. An operation detecting CPU (404) outputs different output signals between a case of having detected the operation of the operating switch (402) and the other case. A signal generating section (405) feeds a control signal for switching the power supply mode to an off mode into a power control section (401): when the hardware circuit (403) outputs an output signal different from an output signal for the case where the operation is continued for longer than the threshold time and the operation detecting CPU (404) outputs an output signal for the case of having detected the operation; or when the hardware circuit (403) outputs the output signal for the case where the operation is continued for longer than the threshold time and the operation detecting CPU (404) outputs an output signal different from the output signal for the case of having detected the operation.

5 Claims, 9 Drawing Sheets (51) Int. Cl.
*G03G 21/14* (2006.01)
*B41J 29/38* (2006.01)
*H04N 1/00* (2006.01)

POWER SUPPLY DEVICE AND IMAGE PROCESSING DEVICE

TECHNICAL FIELD

The present invention relates to power supply devices and image processing devices that are switchable among a plurality of power supply modes including an off mode for shutting off power supply to a power supply target.

BACKGROUND ART

Recently, multifunction peripherals (MFPs) having a plurality of functions have been used in offices and so on. Multifunction peripherals are often used in situations where they are connected via a network, such as a LAN (local area network), to information processing terminals, such as personal computers.

In such multifunction peripherals, a function of, when not in use, switching their power supply mode from a mode for supplying power to the whole of the multifunction peripheral to a low-power consumption mode (sleep mode) in which the power consumption is reduced is widely adopted. This function enables reduction of environmental load. Furthermore, apparatuses employing an off mode are recently emerging. The off mode refers to a mode in which a plug is connected to an outlet but power is substantially in the off state, for example, a mode in which only the operation of a power key (power button) provided on an operating panel or the like can be detected and power supply to other components of the multifunction peripheral is stopped. The adoption of this off mode enables the multifunction peripheral to meet the demand for further reduction of power consumption, such as the European ErP (Energy-related Products) Directive.

The transition to the off mode can be achieved, for example, by operating the above-mentioned power key. Recently, multifunction peripherals have been provided with multiple operating keys including a power key and have widely employed a configuration in which a CPU detects key operations of the multiple operating keys (see for example Patent Literature 1). This configuration enables key operations to be efficiently detected.

However, in the configuration in which the CPU detects key operations, once an abnormal state (disabled state), such as runaway, occurs in the CPU, the CPU becomes no longer able to detect any key operation. In this case, the CPU also becomes unable to detect any operation of the power key. Therefore, it is also impossible to achieve the transition of the power supply mode to the off mode by operating the power key and thus shut off power supply to the CPU. In this situation, it may be possible to pull the plug out of the outlet to forcedly shut off power supply. However, the outlet is often located at a place where the user readily cannot insert and remove the plug, such as a wall surface behind the multifunction peripheral. Furthermore, such a power shut-off manner may damage to an HDD and other devices mounted in the multifunction peripheral.

CITATION LIST

Patent Literature

Patent Literature 1: JP-A-2009-064146

SUMMARY OF INVENTION

Technical Problem

The above-mentioned Patent Literature 1 discloses a configuration in which the power of the CPU is turned off by continuing to press down the power key for a certain time or more. However, the premise of Patent Literature 1 is that a microcomputer can detect a pressing of the power key. Therefore, if the microcomputer becomes unable to even detect a pressing of the power key, the above technique has no way to cope with the above situation.

The present invention has been made in view of such circumstances in the past and, therefore, has an object of providing a power supply device and an image processing device that enable transition of the power supply mode even under situations where a CPU falls into a disabled state and thus becomes unable to detect a pressing of an operating key.

Solution to Problem

A power supply device according to an aspect of the present invention includes a power control section, an operating switch, a hardware circuit, an operation detecting CPU, and a signal generating section. The power control section controls switching among a plurality of power supply modes including an off mode for shutting off power supply to a power supply target. The operating switch is used for the switching among the power supply modes and maintained in one of an on state and an off state by a user's operation. The hardware circuit outputs different output signals between a case where the operation of the operating switch is continued for longer than a predetermined threshold time and the other cases. The operation detecting CPU outputs different output signals between a case of having detected the operation of the operating switch and the other case. When the hardware circuit outputs an output signal different from an output signal for the case where the operation is continued for longer than the threshold time and the operation detecting CPU outputs an output signal for the case of having detected the operation, the signal generating section feeds a control signal for switching the power supply mode to the off mode into the power control section. Also, when the hardware circuit outputs the output signal for the case where the operation is continued for longer than the threshold time and the operation detecting CPU outputs an output signal different from the output signal for the case of having detected the operation, the signal generating section feeds the control signal into the power control section. Furthermore, when the hardware circuit outputs the output signal different from the output signal for the case where the operation is continued for longer than the threshold time and the operation detecting CPU outputs the output signal different from the output signal for the case of having detected the operation, the signal generating section does not feed the control signal into the power control section. Also, when the hardware circuit outputs the output signal for the case where the operation is continued for longer than the threshold time and the operation detecting CPU outputs the output signal for the case of having detected the operation, the signal generating section does not feed the control signal into the power control section.

An image forming apparatus according to another aspect of the present invention includes the above-described power supply device.

Advantageous Effects of Invention

The present invention enables transition of the power supply mode with a relatively simple configuration even under situations where the operation detecting CPU falls into a disabled state and thus becomes unable to detect a pressing of an operating key.

DESCRIPTION OF EMBODIMENTS

A description will be given below in more detail of one embodiment of the present invention with reference to the drawings. Hereinafter, the present invention is embodied as a digital multifunction peripheral. The digital multifunction peripheral according to this embodiment is configured so that it can perform a plurality of functions, including an image reading function, an image forming function (copy function and print function), a facsimile sending/receiving function, and a network sending/receiving function. Each function is implemented by one or more of an image reading section, an image forming section, a FAX interface, and a network interface and the image reading section, the image forming section, the FAX interface, and the network interface are each constituted as a single or plurality of units capable of being individually supplied with power.

Furthermore, the digital multifunction peripheral is configured to be switchable among a plurality of power supply modes, including a standby mode in which power is supplied to a single or plurality of units and at least one function (image processing) can be performed, a low-power consumption mode (sleep mode) in which the power consumption is reduced as compared with the standby mode by supplying minimum power necessary for, for example, accepting an entry of a user's instruction through an operating panel, and an off mode in which power supply to all the units is shut off and only a pressing of a specific button, such as a power key, can be detected.

Figure 1:
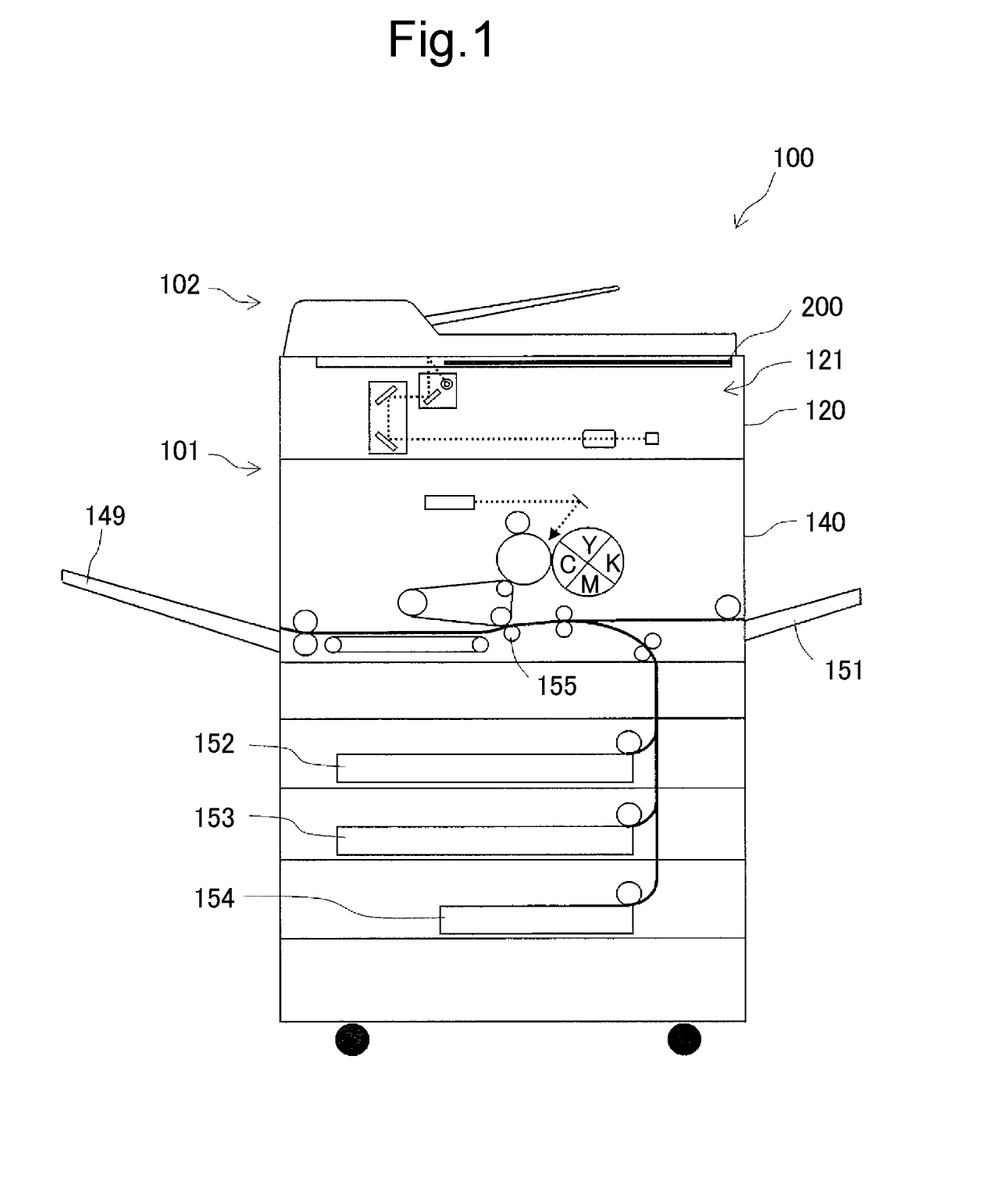
FIG. 1 is a schematic structural view showing an overall structure of a multifunction peripheral in one embodiment of the present invention.

FIG. 1 is a schematic structural view showing an example of an overall structure of a digital multifunction peripheral in this embodiment. As shown in FIG. 1, the multifunction peripheral 100 includes: a main body 101 including an image reading section 120 and an image forming section 140; and a platen cover 102 mounted on top of the main body 101. An operating panel 200 is provided at the front of the multifunction peripheral 100.

The image reading section 120 is provided in an upper portion of the main body 101. The image reading section 120 reads an image of an original document with a scanning optical system 121 and generates digital data (image data) of the image.

The multifunction peripheral 100 can print the generated image data on a sheet in the image forming section 140. Furthermore, the multifunction peripheral 100 can send the generated image data via an unshown network or public communication line to other equipment.

The image forming section 140 prints, on a sheet, image data generated by the image reading section 120 or image data received from other equipment (not shown) connected thereto via the network or the public communication line. The image forming section 140 feeds a sheet from a manual feed tray 151, sheet feed cassettes 152, 153, 154 or the like to a transfer section 155 for transferring a toner image to the sheet. The sheet having the toner image transferred thereto in the transfer section 155 is discharged to an output tray 149.

Figure 2:
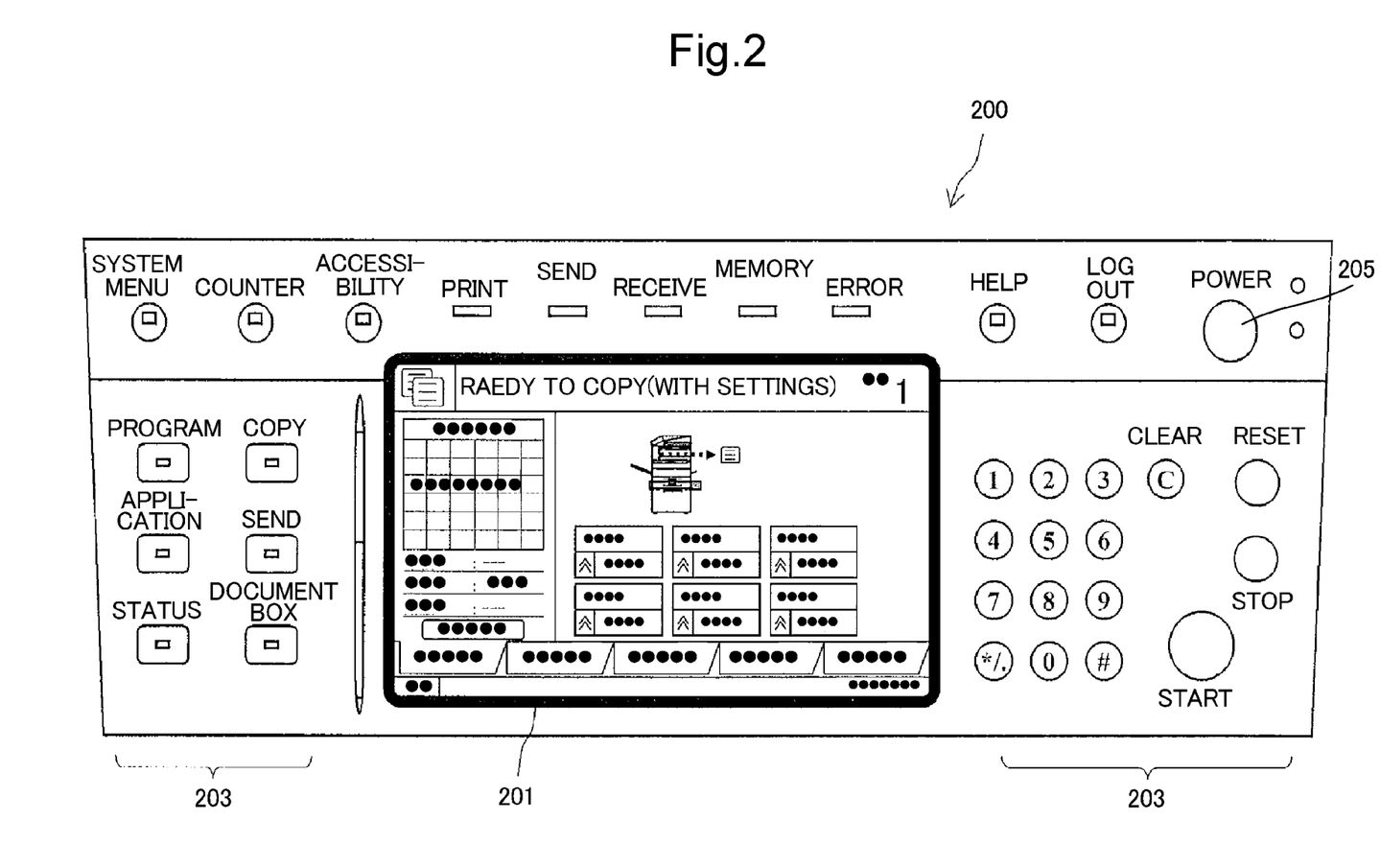
FIG. 2 is a schematic view showing an operating panel of the multifunction peripheral in the one embodiment of the present invention.

FIG. 2 is a view showing an example of an appearance of the operating panel included in the multifunction peripheral. Using the operating panel 200, a user can give an instruction to start copying or other instructions to the multifunction peripheral 100 and confirm the status and settings of the multifunction peripheral 100. A touch panel-mounted display 201 and operating keys 203 are arranged on the operating panel 200. The display 201 includes: a display screen formed of, for example, a liquid crystal display that displays operating buttons, messages, and so on; and a sensor that detects a point of touch on the display screen. No particular limitation is placed on the method for detecting a point of touch. Any method, such as a resistive film method, a capacitive method, a surface acoustic wave method or an electromagnetic wave method, can be adopted. The user can do inputting through the display 201 using his/her own finger or the like. Furthermore, the operating keys 203 include a power key 205. As will hereinafter be described in detail, the power key 205 is used for switching between power ON and OFF of the multifunction peripheral 100 (transition to an off mode and return from the off mode).

Figure 3:
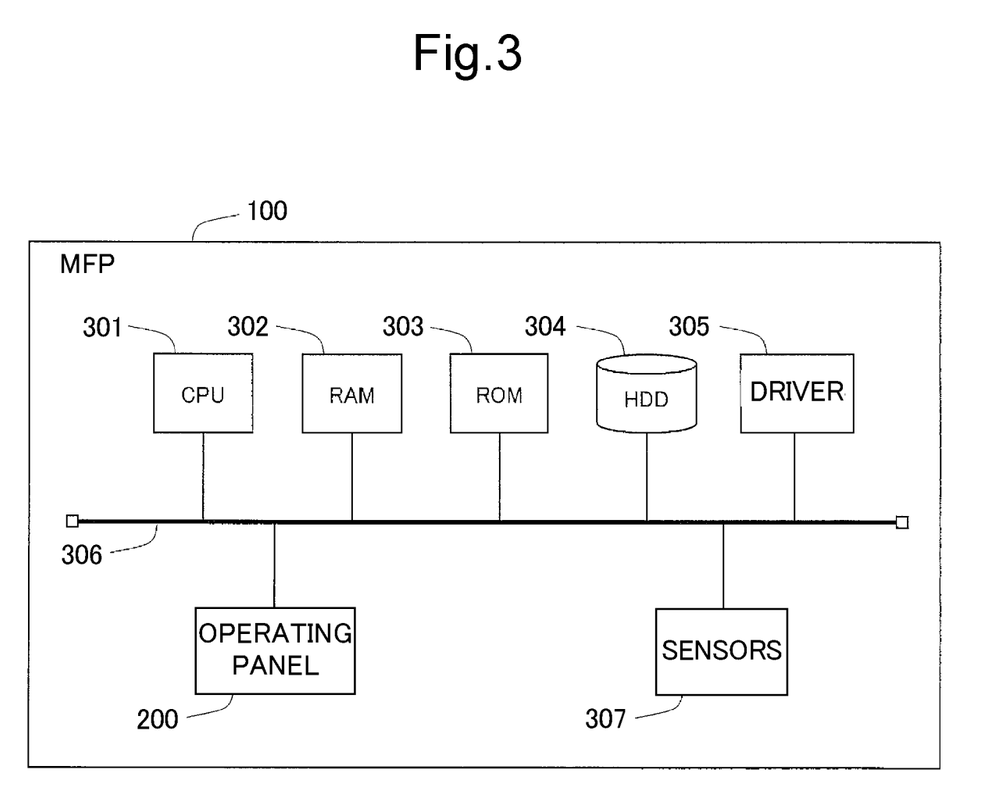
FIG. 3 is a diagram showing a hardware configuration of the multifunction peripheral in the one embodiment of the present invention.

FIG. 3 is a hardware configuration diagram of a control system in the multifunction peripheral 100. In the multifunction peripheral 100 of this embodiment, a CPU (central processing unit) 301, a RAM (random access memory) 302, a ROM (read only memory) 303, an HDD (hard disk drive) 304, and a driver 305 are connected to each other via an internal bus 306. The driver 305 corresponds to respective drive parts of the image reading section 120 and the image forming section 140. The ROM 303, the HDD 304, and the like store programs. The CPU 301 controls the multifunction peripheral 100 according to instructions of a control program therefor. For example, the CPU 301 uses the RAM 302 as a workspace to send and receive data and instructions to and from the driver 305. Thus, it controls the operation of each of the drive parts. Furthermore, the HDD 304 is also used when storing image data acquired by the image reading section 120 or image data received via the network from other equipment.

The internal bus 306 is also connected to the operating panel 200 and various sensors 307. The operating panel 200 accepts a user's operation and supplies a signal based on the operation to the CPU 301. The display 201 displays an above-mentioned operation screen according to a control signal from the CPU 301. The sensors 307 include various sensors, such as a sensor for detecting opening/closing of the platen cover 102, a sensor for detecting an original document on a platen, a temperature sensor for a fixing device, and a sensor for detecting a sheet or an original document being conveyed. Although not necessarily limited thereto, in this embodiment, the CPU 301 includes a plurality of CPUs. An operation detecting CPU 404 to be described hereinafter is included in the CPU 301.

Figure 4:
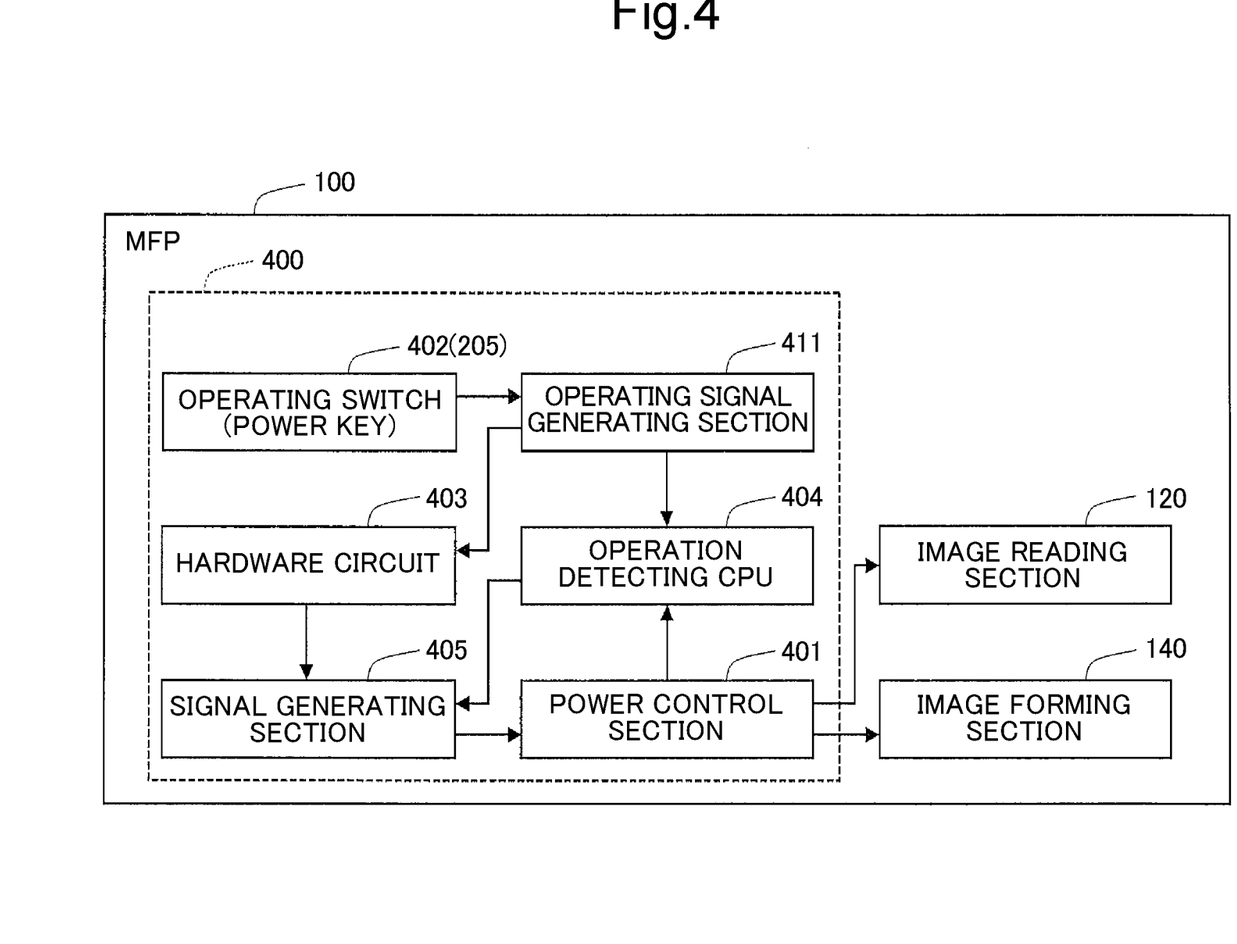
FIG. 4 is a functional block diagram showing the multifunction peripheral in the one embodiment of the present invention.

FIG. 4 is a functional block diagram showing components related to switching among power supply modes of the multifunction peripheral of this embodiment. As shown in FIG. 4, the multifunction peripheral 100 of this embodiment includes a power supply device 400 that supplies power to units, including the image reading section 120 and the image forming section 140. The power supply device 400 includes a power control section 401, an operating switch 402, a hardware circuit 403, an operation detecting CPU 404, a signal generating section 405, and an operating signal generating section 411.

The power control section 401 controls switching among a plurality of power supply modes including the off mode for shutting off power supply to the units which are power supply targets. In this embodiment, the power control section 401 controls switching among a plurality of power supply modes including, but not necessarily limited to, the above-mentioned standby mode, low-power consumption mode, and off mode.

The standby mode includes not only a mode in which only one of the functions (such as the image reading function, the image forming function, the facsimile sending/receiving function, and the network sending/receiving function) capable of being performed by the multifunction peripheral 100 can be immediately performed, but also a mode in which only some of the functions can be immediately performed (for example, a mode in which power supply to devices having a large power consumption, such as the fixing device, is stopped and the image forming function cannot immediately be performed) and a mode in which all the functions can be immediately performed.

In the low-power consumption mode, power is supplied to only part of the multifunction peripheral 100, so that the multifunction peripheral 100 is maintained in a state where whether to meet a condition of transition from the low-power consumption mode to another power supply mode can be detected. For example, power supply to sensors (such as the sensor for detecting opening/closing the platen cover and the sensor for detecting an original document), the RAM 302, the HDD 304, and units (such as the image reading section 120 and the image forming section 140), all of which are not related to the detection of whether to meet the transition condition, is stopped. Furthermore, only minimum power necessary for the detection is supplied to the CPU 301.

For example, when a state where no instruction is input to the multifunction peripheral 100 is continued for a predetermined time while the power supply mode of the multifunction peripheral 100 is the standby mode, the power control section 401 switches the power supply mode from the standby mode to the low-power consumption mode. Furthermore, when a user's instruction is input through the operating panel 200 while the power supply mode of the multifunction peripheral 100 is the low-power consumption mode, the power control section 401 switches the power supply mode from the low-power consumption mode to the standby mode according to the contents of the user's instruction.

On the other hand, in the off mode, the multifunction peripheral 100 is maintained in a state where only an operation of the operating switch 402 can be detected, and shuts off power supply to the components not related to the detection. The operating switch 402 is used for the switching among the power supply modes and maintained in one of the on state and the off state by a user's operation. In this embodiment, the power key 205 formed of a press-button switch functions as the operating switch 402. As described previously, when the power key 205 is operated, the multifunction peripheral 100 transitions to the off mode or returns from the off mode. Although not necessarily limited thereto, in this embodiment, the operating signal generating section 411 generates a signal corresponding to the operation of the power key 205. The operating signal generating section 411 outputs different output signals between a state where the power key 205 (operating switch 402) is operated and a state where it is not operated. Then, the output signal is input to the hardware circuit 403 and the operation detecting CPU 404.

The hardware circuit 403 outputs different output signals between a case where the operation of the operating switch 402 is a long-time operation in which the operating time of the operating switch 402 is longer than a predetermined threshold time and the other cases, i.e., when the operation of the operating switch 402 is a short-time operation or when any operation of the operating switch 402 is not detected. In this relation, the hardware circuit 403 is constituted by a circuit not including any software-implemented circuit, such as a CPU, capable of implementing a function by executing software.

Although not necessarily limited thereto, in this embodiment, the hardware circuit 403 outputs a logic signal at a High level, in the case where the operation of the operating switch 402 is a long-time operation. On the other hand, in the other cases, i.e., when the operation of the operating switch 402 is a short-time operation or when any operation of the operating switch 402 is not detected, the hardware circuit 403 outputs a logic signal at a Low level.

The operation detecting CPU 404 outputs different output signals between a case of having detected any operation of the operating switch 402 and the other case. In other words, the operation detecting CPU 404 outputs different output signals between the case of having detected a short-time operation or a long-time operation of the operating switch 402 and the case of having detected neither short-time operation nor long-time operation of the operating switch 402. As described previously, the operation detecting CPU 404 detects the operation of each of the operating keys 203 provided in the operating panel 200 or the operation of the display 201, for example, by executing a program stored in the above-described ROM 303. The operation detecting CPU 404 detects the operation of each of the operating keys 203, for example, by known key matrix scanning. Furthermore, the operation detecting CPU 404 detects the operation of the display 201 based on the coordinates of elements of the operation screen displayed on the display screen of the display 201 and the coordinates of a point of touch on the display screen detected by the sensor of the display 201.

Although not necessarily limited thereto, in this embodiment, the operation detecting CPU 404 outputs a logic signal at a High level in the case of having detected a short-time operation or a long-time operation of the operating switch 402. On the other hand, in the case of having detected neither short-time operation nor long-time operation of the operating switch 402, the operation detecting CPU 404 outputs a logic signal at a Low level.

When the hardware circuit 403 outputs an output signal different from an output signal for the case of the long-time operation and the operation detecting CPU 404 outputs an output signal for the case of having detected the operation of the operating switch 402, the signal generating section 405 feeds a control signal for switching the power supply mode to the off mode into the power control section 401. Also, when the hardware circuit 403 outputs the output signal for the case of the long-time operation and the operation detecting CPU 404 outputs an output signal different from the output signal for the case of having detected the operation of the operating switch 402, the signal generating section 405 feeds the control signal for switching the power supply mode to the off mode into the power control section 401.

On the other hand, when the hardware circuit 403 outputs the output signal different the output signal for the case of the long-time operation and the operation detecting CPU 404 outputs the output signal different from the output signal for the case of having detected the operation of the operating switch 402, the signal generating section 405 does not feed the control signal for switching the power supply mode to the off mode into the power control section 401. Also, when the hardware circuit 403 outputs the output signal for the case of the long-time operation and the operation detecting CPU 404 outputs the output signal for the case of having detected the operation of the operating switch 402, the signal generating section 405 does not feed the control signal for switching the power supply mode to the off mode into the power control section 401.

Figure 5:
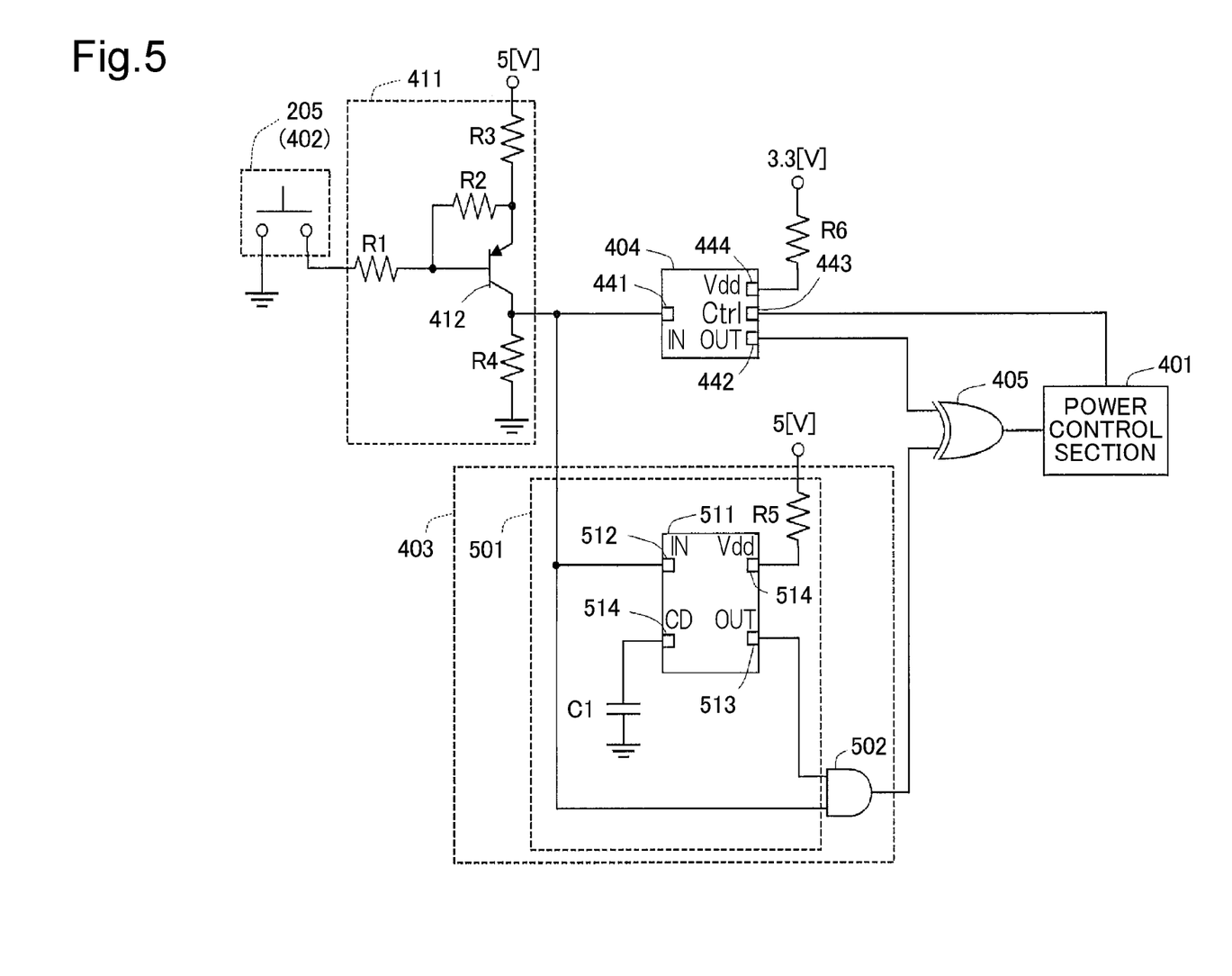
FIG. 5 is a configuration diagram showing an example of a configuration implementing a power supply device in the one embodiment of the present invention.

FIG. 5 is a diagram showing an example of a configuration implementing the above-described power supply device 400. In this example, the operating signal generating section 411 is constituted by a pull-down circuit that outputs logic signals having different logical values between when the power key 204 as the operating switch 402 is operated and when not operated. Specifically, as shown in FIG. 5, the power key 205, which is a press-button switch, is connected at one terminal to a ground potential. On the other hand, the other terminal of the power key 205 is connected through a current-limiting resistor R1 to the base of a PNP transistor 412. A 5V power supply potential is applied through a resistor R3 to the emitter of the PNP transistor 412. The collector of the PNP transistor 412 is grounded through a pull-down resistor R4. Furthermore, the emitter and base of the PNP transistor 412 are connected through a pull-up resistor R2 to each other.

In the above operating signal generating section 411, when the power key 205 is not operated (in the case of the off state), the PNP transistor 412 is in the off state and the output potential of the operating signal generating section 411 is 0V (a Low-level signal). On the other hand, when the power key 205 is operated (in the case of the on state), the PNP transistor 412 is in the on state and the output potential of the operating signal generating section 411 is 5V (a High-level signal). Note that, as described previously, the output signal of the operating signal generating section 411 is input to the hardware circuit 403 and the operation detecting CPU 404.

As shown in FIG. 5, the hardware circuit 403 includes a delay circuit 501 and a logic circuit 502. The delay circuit 501 outputs a logic signal having the same logic as the output signal of the operating signal generating section 411 with a delay of a period of time corresponding to a threshold time relative to the output signal of the operating signal generating section 411. In this example, the delay circuit 501 is constituted by a reset IC 511 capable of controlling the delay time with an external condenser C1. When a transition is made from a state where a potential (a Low-level signal in this case) lower than a reference potential is input to an input terminal 512 of the reset IC 511 to a state where a potential (a High-level signal in this case) equal to or higher than the reference potential is input to the input terminal 512, the reset IC 511 outputs from an output terminal 513 thereof a potential being applied to a power supply terminal 514 thereof after the passage of the delay time set by the condenser C1 connected to a condenser connecting terminal 514 thereof. In this example, a power supply potential of 5V (High-level signal) is applied through a current-limiting resistor R5 to the power supply terminal 514. Note that the delay time defined by the condenser C1 is the above-described threshold time. Although not necessarily limited thereto, for example, a time of about three seconds can be set as the delay time.

The logic circuit 502 is fed with the output signal of the operating signal generating section 411 and the output signal of the delay circuit 301 and outputs different output signals between the case where the operation of the power key 205 is a long-time operation and the case where it is a short-time operation. In this example, the logic circuit 502 is constituted by an AND circuit. Therefore, when both the output signal of the operating signal generating section 411 and the output signal of the delay circuit 501 are High-level signals, the logic circuit 502 outputs a High-level signal. On the other hand, when at least one of the output signal of the operating signal generating section 411 and the output signal of the delay circuit 501 is a Low-level signal, the logic circuit 502 outputs a Low-level signal.

For example, when a short-time operation of the power key 205 shorter than the threshold time (three seconds in this case) is performed, the power key 205 is no longer operated at a point in time when the threshold time has passed since the start of the operation. Therefore, the output signal of the operating signal generating section 411 is at a Low level. Meanwhile, the output signal of the delay circuit 501 turns to a High level at the point in time when the threshold time has passed since the start of the operation of the power key 205, and thereafter the output signal of the delay circuit 501 turns back to a Low level when a time for which the operation of the power key 205 was being operated has passed. Therefore, in this case, the logic circuit 502 continues to output a Low-level signal.

On the other hand, when a long-time operation of the power key 205 longer than the threshold time is performed, the power key 205 is still operated at a point in time when the threshold time has passed since the start of the operation. Therefore, the output signal of the operating signal generating section 411 is at a High level. Meanwhile, the output signal of the delay circuit 501 turns to a High level at the point in time when the threshold time has passed since the start of the operation of the power key 205. Accordingly, in this case, the output of the logic circuit 502 turns to a High-level signal at the point in time when the threshold time has passed since the start of the operation of the power key 205.

Hence, the hardware circuit 403 having the above-described configuration outputs a High-level signal in the case of a long-time operation in which the operating time of the power key 205 (operating switch 402) is longer than the predetermined threshold time, and outputs a Low-level signal in the case of a short-time operation in which the operating time does not correspond to the long-time operation or in the case where any operation of the operating switch 402 is not performed.

Furthermore, as shown in FIG. 5, the output signal of the operating signal generating section 411 is also input to an input terminal 441 of the operation detecting CPU 404. The operation detecting CPU 404 detects an operation of the operating switch 402 when the time for which the High-level output signal of the operating signal generating section 411 is input is within the threshold time and the logic of the output signal of the operating signal generating section 411 has been inverted or when the time for which the High-level output signal of the operating signal generating section 411 is input exceeds the threshold time. The operation detecting CPU 404 outputs a High-level signal from an output terminal 442 thereof when it has detected an operation (short-time operation or long-time operation) of the power key 205. On the other hand, when having not detected any operation (short-time operation and long-time operation) of the operating switch 402, the operation detecting CPU 404 outputs a Low-level signal from the output terminal 442. In this example, a 3.3V power supply voltage is applied through a current-limiting resistor R6 to the operation detecting CPU 404.

For example, when an operation of the power key 205 is performed, a High-level signal is input to the input terminal 441 of the operation detecting CPU 404. At this time, the operation detecting CPU 404 starts measuring the time for which the High-level signal is input and determines whether or not the measured time exceeds the above-described threshold time.

When the operation of the power key 205 is a short-time operation, the time for which a High-level output signal of the operating signal generating section 411 is input does not exceed the threshold time. In this case, the operation detecting CPU 404 outputs a High-level signal from the output terminal 442 at a point in time when the short-time operation of the power key 205 is completed. On the other hand, when the operation of the power key 205 is a long-time operation, the time for which a High-level output signal of the operating signal generating section 411 is input exceeds the threshold time. In this case, the operation detecting CPU 404 outputs a High-level signal from the output terminal 442 at a point in time when the operating time of the power key 205 exceeds the threshold time. Note that when a Low-level signal is input to the input terminal 441 of the operation detecting CPU 404, the operation detecting CPU 404 outputs a Low-level signal from the output terminal 442.

Furthermore, in this example, the signal generating section 405 is constituted by an exclusive OR circuit to which the output signal of the hardware circuit 403 and the output signal of the operation detecting CPU 404 are input. Therefore, the signal generating section 405 outputs a High-level signal when only one of the output signal of the hardware circuit 403 and the output signal of the operation detecting CPU 404 is a High-level signal. Specifically, when the hardware circuit 403 outputs the output signal (High-level signal) for the case of a long-time operation and concurrently the operation detecting CPU 404 outputs the output signal (Low-level signal) for the case of having not detected any operation (short-time operation and long-time operation), the signal generating section 405 outputs a High-level signal. Also, when the hardware circuit 403 outputs the output signal (Low-level signal) for the case of a short-time operation or the case where any operation of the operating switch 402 is not performed and concurrently the operation detecting CPU 404 outputs the output signal (High-level signal) for the case of having detected any operation (short-time operation and long-time operation), the signal generating section 405 outputs a High-level signal. Note that in this example the control signal for switching the power supply mode to the off mode in the power control section 401 is a High-level signal.

As shown in FIG. 5, the output signal (an instruction to change the mode) of the power control section 401 is also input to a control terminal 443 of the operation detecting CPU 404. When inputting the instruction to transition to the off mode from the power control section 401, the operation detecting CPU 404 transitions to a state where it detects only an operation of the power key 205. In doing so, the operation detecting CPU 404 implements this state by reading a program for the off mode and executing it. This state is maintained until it inputs an instruction to transition to another mode, such as the standby mode or the low-power consumption mode, from the power control section 401.

FIGS. 6A, 6B, 7A, and 7B are diagrams for illustrating the operations of the power supply device 400 having the above-described configuration. In this case, it is premised that the power supply mode of the multifunction peripheral 100 is a mode (standby mode or low-power consumption mode) other than the off mode.

Figure 6A:
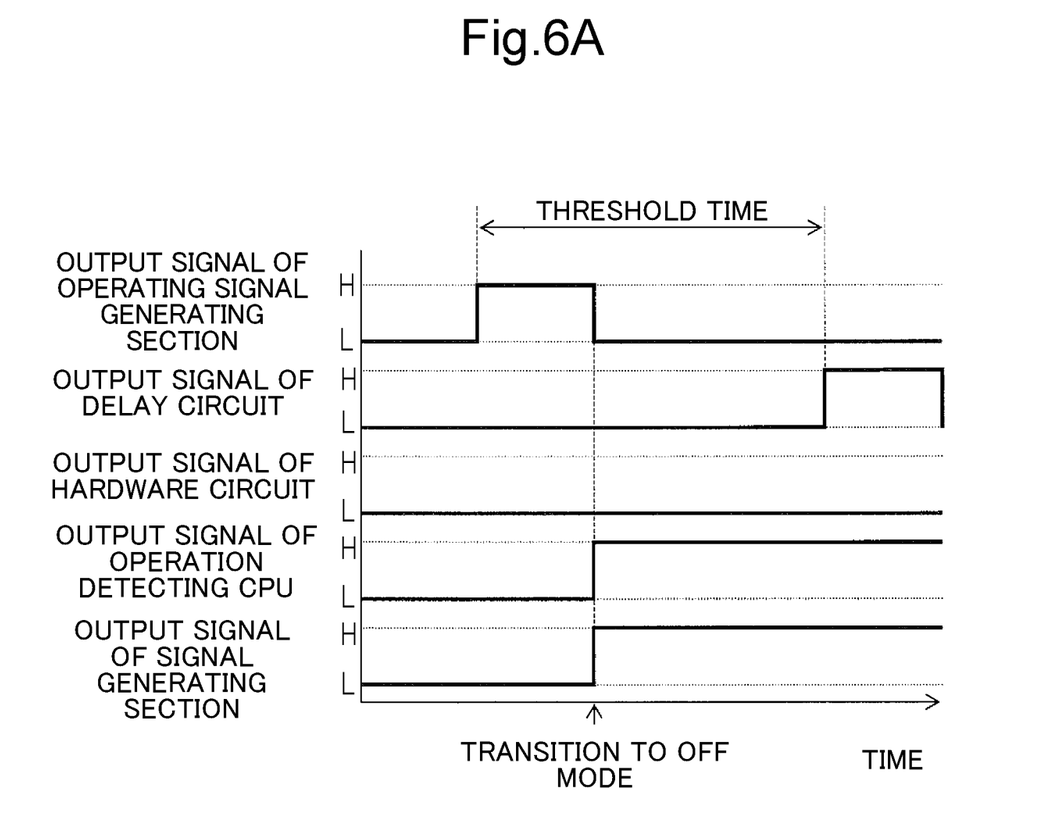
FIG. 6A is a diagram for illustrating an example of operations of the power supply device in the one embodiment of the present invention.
Figure 6B:
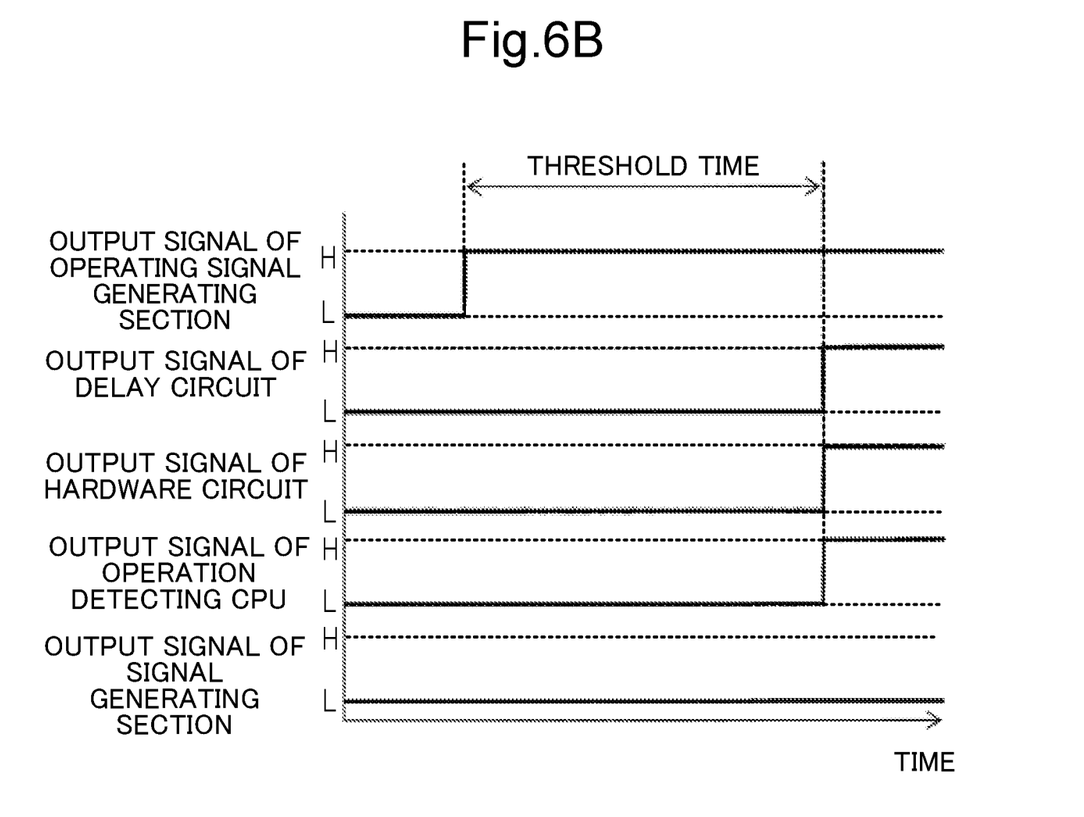
FIG. 6B is a diagram for illustrating an example of the operations of the power supply device in the one embodiment of the present invention.
Figure 7A:
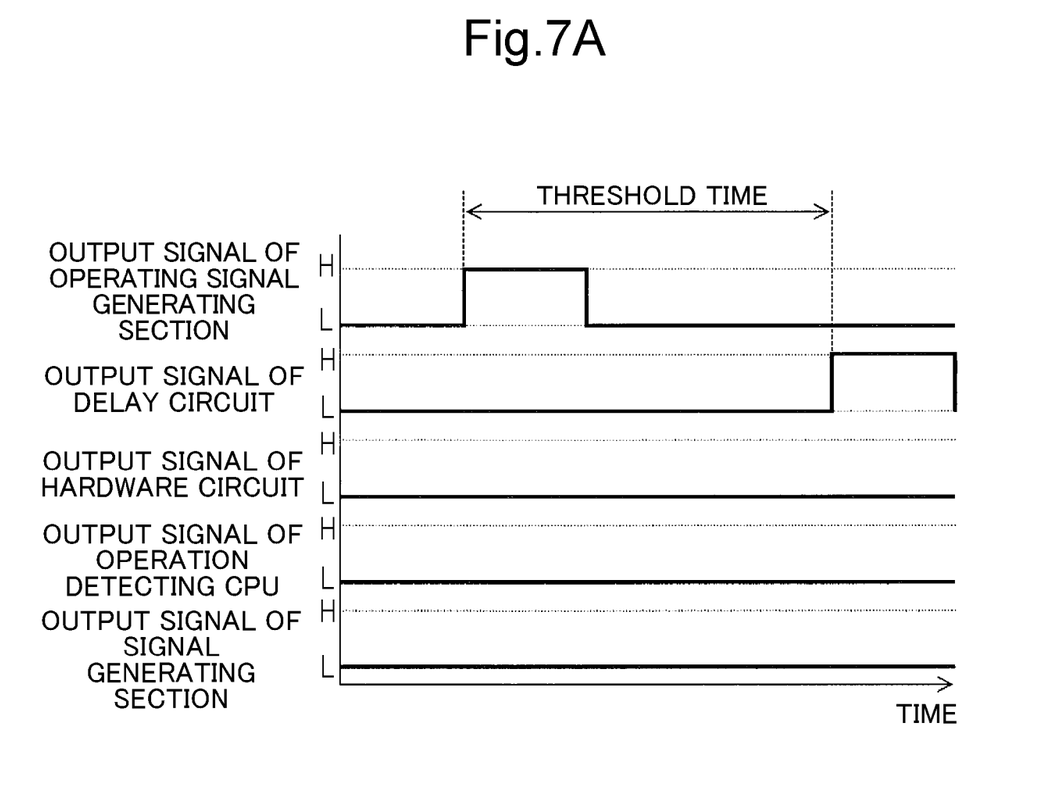
FIG. 7A is a diagram for illustrating an example of the operations of the power supply device in the one embodiment of the present invention.
Figure 7B:
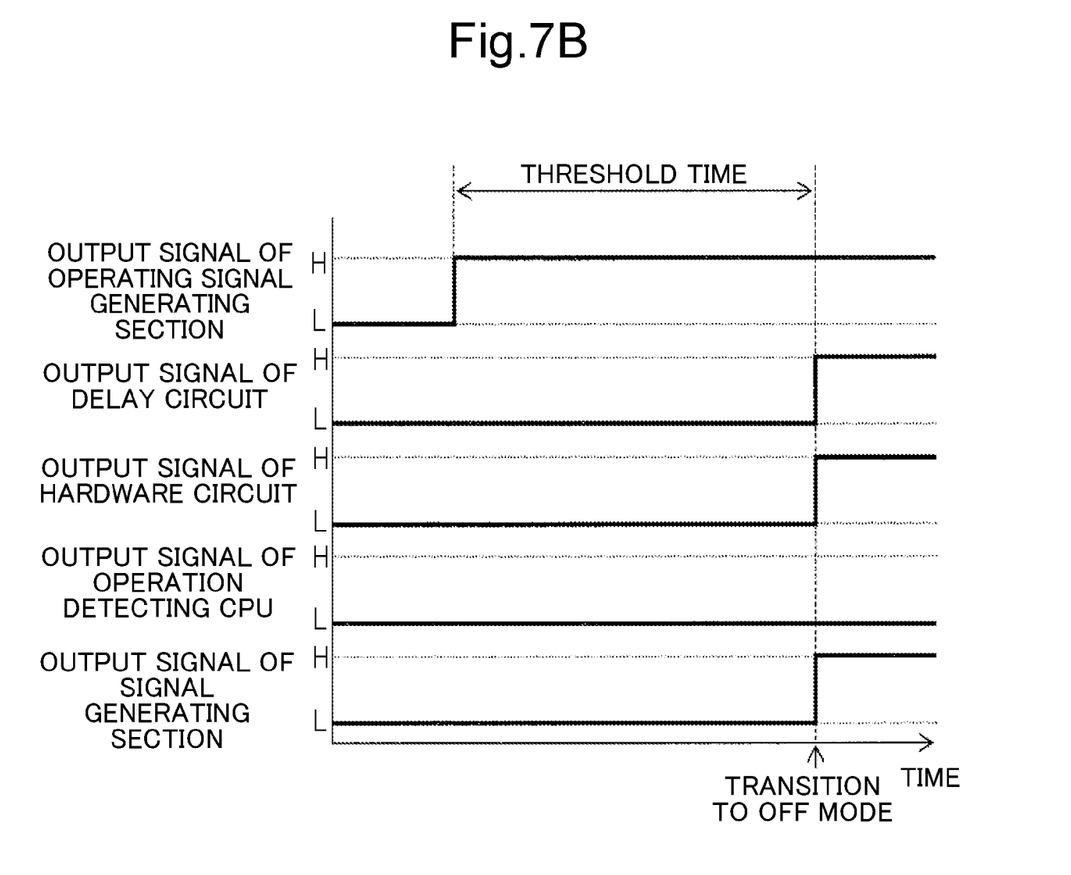
FIG. 7B is a diagram for illustrating an example of the operations of the power supply device in the one embodiment of the present invention.

FIGS. 6A and 6B correspond to the case where the operation detecting CPU 404 normally operates. FIGS. 7A and 7B correspond to the case where the operation detecting CPU 404 does not normally operate (falls into a disable state), for example, because the operation detecting CPU 404 runs away. Furthermore, FIGS. 6A and 7A correspond to a short-time operation of the power key 205 and FIGS. 6B and 7B correspond to a long-time operation of the power key 205. In each of FIGS. 6A, 6B, 7A, and 7B, the output signal of the operating signal generating section 411, the output signal of the delay circuit 501, the output signal of the hardware circuit 403 (logic circuit 502), the output signal of the operation detecting CPU 404, and the output signal of the signal generating section 405 are shown in order from above downward. The abscissa axis in FIGS. 6A, 6B, 7A, and 7B corresponds to the time. In this example, an instruction to transition to the off mode is issued by the power control section 401 at a point in time when the output signal of the signal generating section 405 turns to a High level. Thus, every signal after the output signal of the signal generating section 405 turns to a High level is not actually output. In the figures, however, for the purpose of illustration, each signal after the output signal of the signal generating section 405 turns to a High level is also shown.

First, a description will be given of the case where the operation detecting CPU 404 normally operates. In this case, the operation detecting CPU 404 can normally recognize an operation of the power key 205.

When, as shown in FIG. 6A, a short-time operation of the power key 205 is performed, the operating signal generating section 411 keeps outputting a High-level signal while the power key 205 is operated (pressed). Then, the delay circuit 501 outputs a High-level signal at a point in time when the threshold time has passed since the start of the operation of the power key 205. In this case, it never happens that the output signal of the operating signal generating section 411 and the output signal of the delay circuit 502 are High-level signals at the same time. Therefore, the hardware circuit 403 continues to output a Low-level signal.

Meanwhile, as described above, at a point in time when the output signal of the operating signal generating section 411 turns from a High-level signal to a Low-level signal, the operation detecting CPU 404 recognizes a short-time operation of the power key 205 and outputs a High-level signal.

In this situation, the signal generating section 405 outputs a High-level signal at a point in time when the operation detecting CPU 404 outputs a High-level signal. Therefore, the power control section 401 provides the transition to the off mode at a point in time when the short-time operation of the power key 305 is completed.

On the other hand, when, as shown in FIG. 6B, a long-time operation of the power key 205 is performed, the operating signal generating section 411 keeps outputting a High-level signal while the power key 205 is operated (pressed). During this time, the delay circuit 501 outputs a High-level signal at a point in time when the threshold time has passed since the start of the operation of the power key 205. In this case, after the threshold time has passed since the start of the operation of the power key 205, both the output signal of the operating signal generating section 411 and the output signal of the delay circuit 501 are High-level signals. Therefore, the hardware circuit 403 outputs a High-level signal at the point in time when the threshold time has passed since the start of the operation of the power key 205.

Meanwhile, as described above, at a point in time when the time for which the High-level signal output from the operating signal generating section 411 is input to the operation detecting CPU 404 exceeds the threshold time, the operation detecting CPU 404 recognizes a long-time operation of the power key 205 and outputs a High-level signal.

In this situation, the hardware circuit 403 also outputs a High-level signal at a point in time when the operation detecting CPU 404 outputs a High-level signal. Therefore, the signal generating section 405 continues to output a Low-level signal. Hence, in the case where the operation detecting CPU 404 normally operates, a long-time operation of the power key 205 does not cause the power supply mode of the multifunction peripheral 100 to transition to the off mode.

Subsequently, a description will be given of the case where the operation detecting CPU 404 is in a disabled state. In this case, the operation detecting CPU 404 cannot recognize any operation of the power key 205. However, the operating signal generating section 411 and the hardware circuit 403 normally operate. Therefore, as shown in FIGS. 7A and 7B, the output signal of the operating signal generating section 411, the output signal of the delay circuit 501, and the output signal of the hardware circuit 403 are the same as those in the case shown in FIGS. 6A and 6B. On the other hand, even when the operation of the power key 205 is a short-time operation or a long-time operation, the output signal of the operation detecting CPU 404 does not change and is maintained at a Low-level signal.

Therefore, when the operation of the power key 502 is a short-time operation, both the output signal of the hardware circuit 403 and the output signal of the operation detecting CPU 404 are Low-level signals. Hence, in the case where the operation detecting CPU 404 does not normally operate, a short-time operation of the power key 205 does not cause the power supply mode of the multifunction peripheral 100 to transition to the off mode.

On the other hand, when the operation of the power key 205 is a long-time operation, the signal generating section 405 outputs a High-level signal at a point in time when the hardware circuit 403 outputs a High-level signal. Therefore, the power control section 401 provides the transition to the off mode at a point in time when a delay time has passed since the start of the operation of the power key 205.

The power supply mode of the multifunction peripheral 100 having transitioned to the off mode transitions to the standby mode (or the low-power consumption mode) by operating the power key 205. In doing so, the operation detecting CPU 404 reads and executes a program for enabling it to recognize any operation of keys other than the power key 205. As a result, the disabled state of the operation detecting CPU 404 is eliminated.

Now, a description will be given of the case where the output signal of the operation detecting CPU 404 is maintained at a High-level output signal regardless of any operation of the power key 205, for example, because the operation detecting CPU 404 runs away. In this case, unless a long-time operation of the power key 205 is performed at a point in time when the above state occurs, the output signal of the hardware circuit 304 is a Low-level signal. Therefore, in the case where the output signal of the operation detecting CPU 404 is maintained at a High-level signal, the signal generating section 405 outputs a High-level signal except for an exceptional situation where a disabled state of the operation detecting CPU 404 occurs during a long-time operation of the power key 205. Hence, the power control section 401 provides the transition to the off mode at a point in time when the operation detecting CPU 404 falls into a disabled state.

As thus far described, in this multifunction peripheral 100, if the operation detecting CPU 404 falls into a disabled state, so that the output signal of the operation detecting CPU 404 is fixed at an output signal for the case of having not detected any operation of the power key 205, the power supply mode switches to the off mode when the output signal of the hardware circuit 403 is an output signal corresponding to a long-time operation of the power key 205. For example, the transition to the off mode can be made by holding down the power key 205. Therefore, the power supply mode of the multifunction peripheral 100 can be safely switched to the off mode without pulling the plug out of the outlet. Furthermore, when, following the transition to the off mode, a further transition is made from the off mode to another power supply mode, it is possible to recover the operation detecting CPU 404 from a disabled state to a normal state.

Moreover, in this multifunction peripheral 100, the operating signal generating section 411, the hardware circuit 403, and the signal generating section 405 can be constituted using general, inexpensive members. Thus, the above-described configuration can be implemented at low cost.

Furthermore, in this multifunction peripheral 100, in the case where the operation detecting CPU 404 normally operates, the power supply mode does not switch to the off mode when the operation detecting CPU 404 detects a long-time operation of the power key 205. In other words, even if an operation of the power key 205 is accidentally started, the power supply mode can be prevented from switching to the off mode by continuing the operation so that a long-time operation can be detected.

Moreover, this multifunction peripheral 100 further includes the operating signal generating section 411 constituted by a pull-up or pull-down circuit that generates logic signals having different logical values between when the operating switch 402 is operated and when not operated and feeds the logic signal into the hardware circuit 403 and the operation detecting CPU 404. In this case, the hardware circuit 403 employs a configuration including the delay circuit 501 and the logic circuit 502. The delay circuit 501 outputs a logic signal having the same logic as the output signal of the operating signal generating section 411 with a delay of a period of time corresponding to the threshold time relative to the output signal of the operating signal generating section 411. The logic circuit 501 is fed with the output signal of the operating signal generating section 411 and the output signal of the delay circuit 301 and outputs different output signals between the case where the operation of the operating switch 402 is a long-time operation and the case where it is a short-time operation.

Furthermore, the operation detecting CPU 404 detects an operation of the operating switch 402 when the time for which the High-level output signal of the operating signal generating section 411 is input is within the threshold time and the logic of the output signal of the operating signal generating section 411 has been inverted or when the time for which the High-level output signal of the operating signal generating section 411 is input exceeds the threshold time.

Moreover, a configuration is employed in which the hardware circuit 403 outputs a logic signal at a High level in the case where the operation of the operating switch 402 is a long-time operation, while the operation detecting CPU 404 outputs a logic signal at a High level in the case of having detected a short-time operation or a long-time operation of the operating switch 402.

The above-described embodiment is not intended to limit the technical scope of the invention and various modifications and applications can be made to the embodiment, and even elements other than as described previously, without departing from the scope of the invention. For example, although the description in the above embodiment has been given of the case where the operating switch 402 is formed of a press-button switch, the operating switch 402 may be any switch so long as it can be maintained at one of the on state and the off state by a user's operation and any form of switch, such as a toggle switch, can be employed as the operating switch 402. Furthermore, although in the above configuration the logic circuit is configured based on a positive logic (active at a High level), it can be configured based on a negative logic (active at a Low level). Moreover, so long as the same operations can be implemented, other logic circuit configurations can also be employed. Furthermore, although in the above configuration the operation detecting CPU 404 is formed of a separate CPU, it can be formed of a shared CPU that implements one or more functions other than the detection of the operation.

Moreover, the circuit configurations of the operating signal generating section 411 and the hardware circuit 403 as disclosed in the above embodiment are illustrative and other circuit configurations having the same operations and effects can also be employed. Furthermore, the operating signal generating section 411 and the hardware circuit 403 have only to have a circuit configuration containing no software-implemented circuit and may be formed not only of a logic circuit but also of an analog circuit.

In addition, although in the above embodiment the present invention is embodied as a power supply device for a digital multifunction peripheral, the present invention is applicable not only to the digital multifunction peripheral but also to any image processing apparatus, such as a printer or a copier, and any power supply device having a plurality of power supply modes including an off mode for shutting off power supply to a power supply target.

The invention claimed is:

1. A power supply device comprising:
   a power control section that controls switching among a plurality of power supply modes including an off mode for shutting off power supply to a power supply target;
   an operating switch that is used for the switching among the power supply modes and maintained in one of an on state and an off state by a user's operation;
   a hardware circuit that outputs different output signals between a case where the operation of the operating switch is continued for longer than a predetermined threshold time and the other cases;
   an operation detecting CPU that outputs different output signals between a case of having detected the operation of the operating switch and the other case; and
   a signal generating section that (i) feeds a control signal for switching the power supply mode to the off mode into the power control section when the hardware circuit outputs an output signal different from an output signal for the case where the operation is continued for longer than the threshold time and the operation detecting CPU outputs an output signal for the case of having detected the operation, (ii) feeds the control signal into the power control section when the hardware circuit outputs the output signal for the case where the operation is continued for longer than the threshold time and the operation detecting CPU outputs an output signal different from the output signal for the case of having detected the operation, (iii) does not feed the control signal into the power control section when the hardware circuit outputs the output signal different from the output signal for the case where the operation is continued for longer than the threshold time and the operation detecting CPU outputs the output signal different from the output signal for the case of having detected the operation, and (iv) does not feed the control signal into the power control section when the hardware circuit outputs the output signal for the case where the operation is continued for longer than the threshold time and the operation detecting CPU outputs the output signal for the case of having detected the operation.

2. The power supply device according to claim 1, further comprising an operating signal generating section constituted by a pull-up or pull-down circuit that outputs signals having different logical values between when the operation of the operating switch is performed and when the operation is not performed and feeds the signal into the hardware circuit and the operation detecting CPU,
   wherein the hardware circuit comprises:
   a delay circuit that outputs a signal having the same logic as the signal output by the operating signal generating section with a delay for a period of time corresponding to the threshold time relative to the signal output by the operating signal generating section; and
   a logic circuit to which the signal output by the operating signal generating section and the signal output by the delay circuit are input and which outputs different output signals between the case where the operation is continued for longer than the threshold time and the other cases.

3. The power supply device according to claim 1, further comprising an operating signal generating section constituted by a pull-up or pull-down circuit that outputs signals having different logical values between when the operation of the operating switch is performed and when the operation is not performed and feeds the signal into the hardware circuit and the operation detecting CPU,
   wherein the operation detecting CPU detects the operation of the operating switch: when a time for which the signal output by the operating signal generating section and corresponding to a state where the operation of the operating switch is performed is input is within the threshold time and the logic of the signal output by the operating signal generating section has been inverted; or when the time for which the signal output by the operating signal generating section and corresponding to the state where the operation of the operating switch is performed is input exceeds the threshold time.

4. The power supply device according to claim 1, wherein the hardware circuit outputs a logic signal at a High level in the case where the operation of the operating switch is continued for longer than the threshold time and in the other cases and the operation detecting CPU outputs a logic signal at a High level in the case of having detected the operation of the operating switch.

5. An image processing device comprising the power supply device according to claim 1.

* * * * *